Inventor
John N. Wolfram
Mason & Porter
Attorneys

Patented Dec. 8, 1942

2,304,390

UNITED STATES PATENT OFFICE 2,304,390

COUPLING

John N. Wolfram, Cleveland, Ohio, assignor to Arthur L. Parker, Cleveland, Ohio

Application November 14, 1940, Serial No. 365,687

5 Claims. (Cl. 284—19)

The present invention relates to new and useful improvements in couplings for joining fluid pressure lines, and more particularly to improvements in a valved coupling by which the fluid pressure lines can be readily connected or disconnected.

An object of the present invention is to provide a coupling of the above type having valve means automatically operable to afford communication between the pressure lines when the lines are connected and to close each pressure line when the lines are disconnected, and wherein the valve means operates automatically to prevent loss of fluid from the pressure lines or access of air to the pressure lines when connecting or disconnecting the lines.

A further object of the invention is to provide a coupling of the above type wherein the over-all length of the coupling remains substantially the same during connecting or disconnecting of the pressure lines so as to eliminate the necessary of bending or springing the pressure line tubes.

A still further object of the invention is to provide a coupling of the above type wherein valve seats are associated with and fixed with respect to the pressure line connections and wherein the valve members are movable relative to the valve seats during manipulation of the coupling for connecting the pressure lines so as to maintain the over-all length of the coupling constant.

A still further object of the invention is to provide a coupling of the above type wherein the packings for preventing leakage of fluid are constantly maintained in fluid-tight relationship with the coupling by the fluid in the system, and wherein the fluid in the system is also utilized for maintaining the valve members seated when the coupling is disconnected.

The above and other objects of the invention will in part be obvious and will be hereinafter more fully pointed out.

Figure 1:
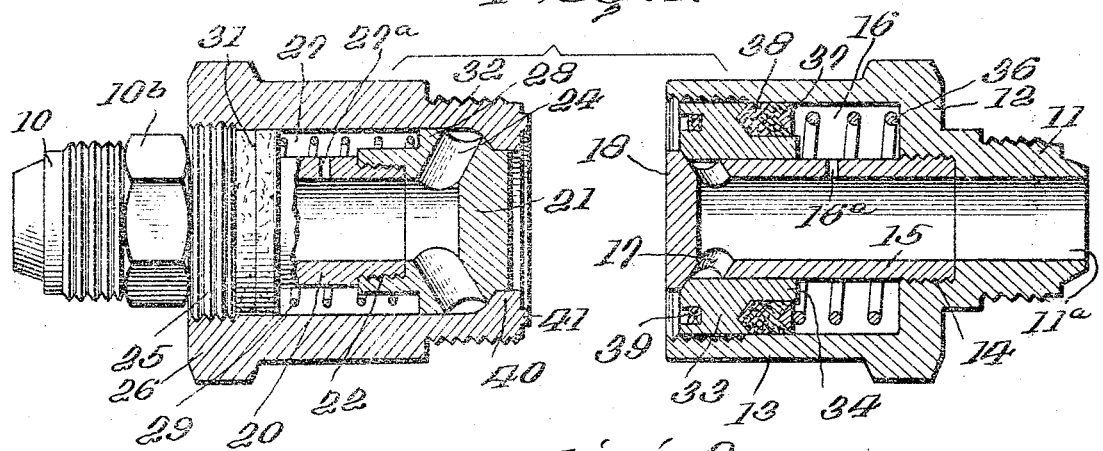
Figure 1 is a longitudinal section showing the coupling completely separated with both pressure lines sealed.

Referring more in detail to the accompanying drawing, the coupling assembly includes end connections in the form of adaptors 10, 11 which may be threaded to receive the ends of tubes or other conduit means constituting the pressure lines. The adaptor 11 has a central passage 11a adapted to communicate with the pressure line and is provided with an outwardly extending flange portion 12 which is provided with a wrench engaging periphery and with a skirt portion 13 extending from the flange portion toward the opposite end of the coupling assembly. This skirt portion is offset concentrically with respect to the passage 11a and constitutes a coupling element in the form of a female coupling member. The inner edge of the adaptor 11 in the region of the flange portion 12 is internally threaded, as at 14, to receive a sleeve 15 which is in communication with the passage 11a. The sleeve 15 is spaced inwardly from the inner surface of the skirt portion 13 so as to provide an annular chamber 16. The inner end of the sleeve 15 is provided with apertures 17 and with an integral head or end portion 18 which is shaped to provide a valve seat 19 around the outer edge thereof and facing toward the adaptor 11.

The adaptor 10 is provided with a central passage 10a adapted to communicate with the pressure line and with an inwardly extending sleeve portion 20. A head or end member 21 is threadedly connected, as at 22, to the inner end of the sleeve portion 20. The member 21 is provided with an annular valve seat 23 around the edge thereof and facing toward the adaptor 11. Apertures 24 are provided in the member 21 between the valve seat and the sleeve portion 20 for affording communication with the passage 10a.

An annulus 25 is slidably mounted on the outer surface of the sleeve portion 20 within the wrench engaging portion 10b thereon and is externally threaded to receive a coupling element 26 in the form of a male coupling member. The inner surface of the coupling member 26 is spaced outwardly from the sleeve portion 20 so as to provide an annular chamber 27 which is closed at one end by an outwardly extending shoulder 28 on the head member 21. A coiled spring 29 is disposed around the sleeve portion 20 within the annular chamber 27 and one end of the spring bears against the shoulder 28. The opposite end of the spring 29 bears against a packing follower 30 which, in turn, bears against V-shaped packing washers within a similarly shaped groove in the annulus 25 in order to prevent leakage of fluid. The spring 29 thus tends to normally urge the coupling member 26 and the connected annulus 25 away from the head or end member 21.

The sleeve portion 13 on the adaptor 11 is internally threaded to engage an externally threaded portion of the coupling member 26, as at 32, so as to provide a detachable connection between the coupling members. It is to be clearly understood, of course, that any form of connection may be employed between the coupling members and in this connection, a suitable form of quick-acting clamping mechanism may be employed. A valve member 33 extends between the sleeve 15 and the inner surface of the sleeve portion 13 so as to provide a movable wall portion for one end of the chamber 16. This valve member 33 is provided with a skirt portion 34 which surrounds the sleeve 15 and extends toward the adaptor 11. A coiled spring 36 is disposed within the chamber 16 with one end bearing against the inner surface of the flange portion 12 and with the opposite end thereof bearing against the packing follower 37 which, in turn, bears against V-shaped packing washers 38 within a similarly shaped recess in the valve member 33 so as to prevent leakage of fluid.

The inner edge of the valve member 33 is provided with an annular recess within which is housed a packing washer 39. The inner end of the sleeve coupling element 26 is shaped to provide an enlarged end portion 40 which is provided with an annular rib 41 adapted to engage the packing washer 39. The inner edge of the enlarged end 40 on the coupling element 26 is shaped to provide a tapered valve surface 42 which is adapted to cooperate with the valve seat 23 on the member 21. The inner edge of the valve member 33 is also provided with a tapered valve surface 43 which is adapted to cooperate with the valve seat 19 on the member 18.

Figure 3:
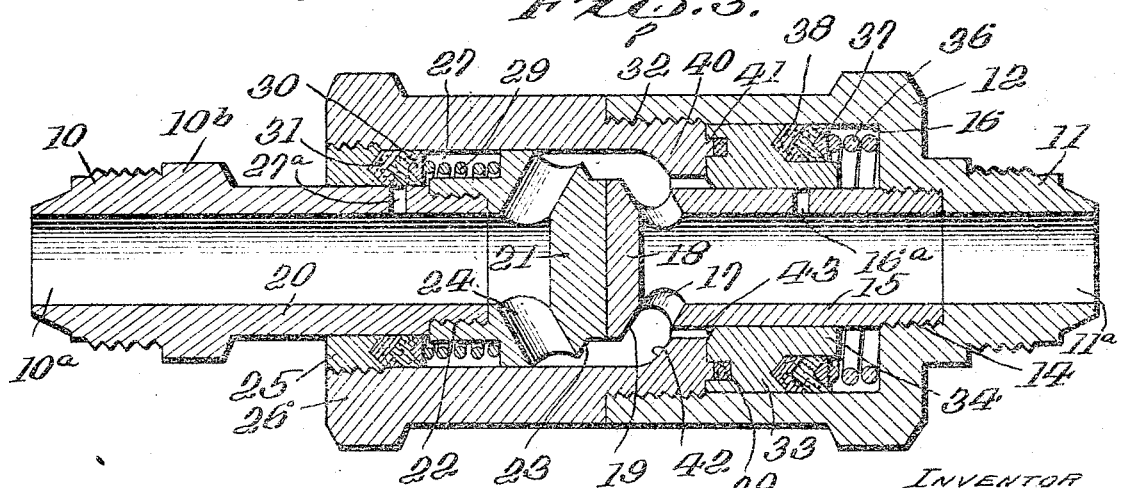
Figure 3 is a longitudinal section, similar to Figure 1, but showing the coupling members tightened relative to one another so that communication is provided between the pressure lines.

When the coupling members 26, 13 have been tightened relative to one another along the threaded connection 32, the parts of the coupling assembly will assume the position shown in Figure 3. In this position of the coupling assembly, the coupling member 26 with the annulus 25 has been shifted inwardly of the sleeve portion 20 toward the head member 22 so as to separate the valve surface 42 from the valve seat 23. This movement of the coupling member 26 effects compression of the spring 29 within the annular chamber 27. During this inward movement of the coupling member 26, the valve member 33 will be similarly moved away from the end member 18 so that the valve surface 43 will be removed from the valve seat 19 and this movement will be effected against the action of the spring 36 within the annular chamber 16. Since both valve surfaces 42, 43 have been removed from their seats 23, 19, respectively, communication is afforded between the passages 11a, 10a through the apertures 17, 24 and around the abutting end members 21, 18.

When it is desired to separate the pressure lines which may be connected to the adaptors 10, 11, the coupling members 13, 26 are relatively rotated so as to unscrew the threaded connection therebetween. During this separation of the coupling members, the compressed spring 36 will force the valve member 33 and its valve surface 43 toward the valve seat 19 on the member 18. Similarly, the coupling member 26 will be shifted along the sleeve portion 20 toward the adaptor 10 so that the valve surface 42 will approach its valve seat 23. A fluid-tight connection is thus maintained by the packing washer 39 since the valve member 33 is maintained abutting against the end 40 of the coupling member 26. The relationship between the inner surface of the valve member 34 and the outer surface of the sleeve 15 may be such as to permit seepage of fluid from the pressure line into the chamber 16 and this fluid within the chamber 16 will augment the action of the spring 36 and tend to force the valve member toward a seated position. Similarly, fluid from the other pressure line may gain access to the chamber 27 and it will be noted that the exposed area of the follower 30 is greater than the exposed inner area of the shoulder 28 so that the tendency of the fluid within the chamber 27 is to force the coupling member 26 and the valve 42 toward a seated position. When very close fit is maintained between the coupling parts, it may be desirable to provide bleed holes 16a, 27a through the sleeves 15, 20, respectively, in order to afford ready access of the fluid to the chambers 16, 27. The fluid within the annular chambers is also utilized for exerting a sealing pressure on the washers 31, 38 so as to maintain a fluid tight seal around the surface of the coupling members. Before the threaded connection 32 between the coupling members is broken, the valves 42, 43 will engage the valve seats 23, 19, respectively, so that the pressure lines are sealed at the end members 19, 21. Thus, when the coupling members 26, 13 are completely separated, no fluid will escape from the pressure lines which are effectively sealed by the valves. The spring 36 will tend to maintain the valve surface 43 in tight sealing engagement with the valve seat 19 and similarly, the spring 29 will tend to maintain the valve surface 42 in tight sealing engagement with the valve seat 23.

Figure 2:
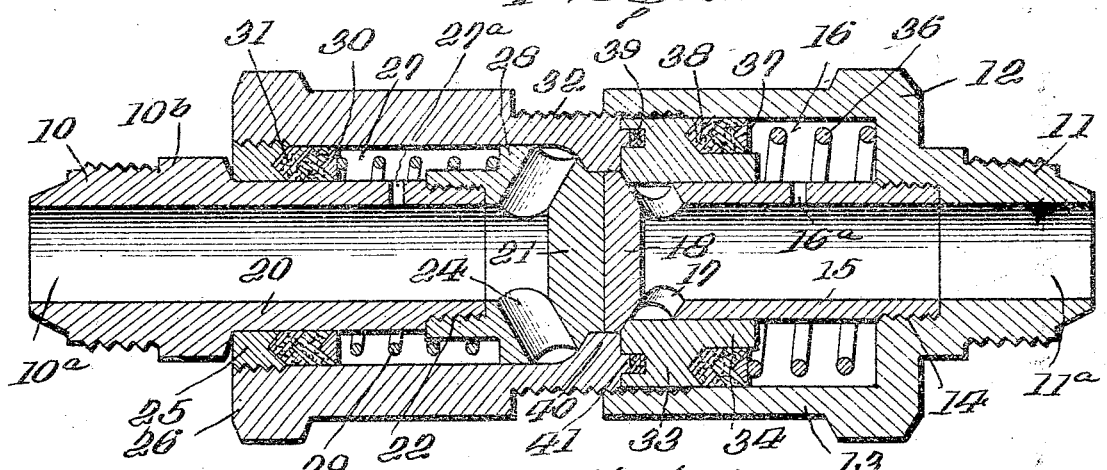
Figure 2 is an enlarged longitudinal section showing the coupling in position for engagement with both pressure lines sealed.

When it is desired to again connect the coupling members, the end members 18, 21 are centered relative to one another and the coupling members 26, 13 are rotated relative to one another to effect initial engagement along the threads 32 as shown in Figure 2. When the coupling members are brought together it is to be particularly noted that there is no space in the assembly for air to accumulate so that access of air to the pressure lines is effectively prevented. Further rotation of the coupling members relative to one another to effect tight clamping of the same along the threads 32, will cause movement of the coupling member 26 and the valve surface 42 toward the opposite end of the coupling. Similarly, the valve member 33 will be moved in unison with the coupling member 26. Thus, the springs 29, 36 will be compressed during tightening of the coupling members and the valve surfaces 42, 43 will be removed from their seats 23, 19, respectively, so as to afford communication between the pressure lines, as illustrated in Figure 3. In this connected position of the coupling members, it will be seen that the bleed hole 16a has been closed by the skirt 34 of the valve member 33 so as to prevent access of fluid to the chamber 16. Similarly, the outer end of the bleed hole 27a has been closed.

From the foregoing description, it will be seen that the valve surfaces 42, 43 are disposed at one side of the valve seat 23 and that the valve members 40, 33 move in unison with one another by the movement of the coupling member 26 relative to the coupling member 13. The head members 18, 21 are fixed with respect to the conduit sleeves 15, 20, respectively, and abut against one another, and the over-all length of the coupling assembly from the adaptor 10 to the adaptor 11 remains constant during manipulation of the coupling members. As shown in Figure 2, the head members 18, 21 may be positioned in abutting relationship substantially coincident with the initial engagement with the threads 32 between the coupling members 13, 26. Such a construction obviates the necessity of bending or springing the pressure tubes which are connected to the adaptors. Such a construction is of particular importance in airplane engine installations in that all of the fluid lines can be disconnected without first loosening the engine from its mounting. Similarly, the engine can be replaced and secured to its mounting before the pressure lines need be connected. The valve members are movable in unison and in the same directions for engaging or disengaging their respective valve seats.

It is to be clearly understood that various changes in the details of construction and arrangement of parts may be made without departing from the scope of the invention as set forth in the appended claims.

I claim:

1. A coupling for joining fluid pressure lines, comprising a pair of conduits each adapted to communicate with a pressure line and said conduits being stationary with respect to each other during connecting or disconnecting of the coupling, means providing a pair of valve seats at the inner end of each of said conduits, means providing a pair of valve surfaces adapted to cooperate with said valve seats for sealing the fluid pressure lines when the coupling is disconnected, and a pair of detachable coupling members movable relative to one another and at least one of said coupling members being movable independently of said conduits into and out of engagement with the other of said coupling members for connecting and disconnecting the conduits without altering the over-all length of the coupling between the conduits.

2. A coupling for joining fluid pressure lines, comprising a pair of conduits each adapted to communicate with a pressure line and said conduits being stationary with respect to each other during connecting or disconnecting of the coupling, a pair of abutting head members one fixed at the inner end of each of said conduits and each of said head members presenting a valve seat, a pair of valve surfaces adapted to cooperate with the valve seats on said head members for sealing the fluid pressure lines when the coupling is disconnected, fluid pressure means for automatically seating the valve surfaces when the coupling members are disconnected, and a pair of detachable coupling members movable relative to one another and at least one of said coupling members being movable independently of both said conduits for connecting and disconnecting the conduits without altering the over-all length of the coupling.

3. A coupling for joining fluid pressure lines, comprising a pair of conduits each adapted to communicate with a pressure line and said conduits being stationary with respect to each other during connecting or disconnecting of the coupling, a pair of abutting head members one fixed at the inner end of each of said conduits and each of said head members presenting a valve seat, means providing a pair of valve surfaces adapted to cooperate with the valve seats on said head members for sealing the fluid pressure lines when the coupling is disconnected and said valve surfaces having abutting portions and being movable in unison with one another during connecting and disconnecting of the coupling, and a pair of detachable coupling members movable relative to one another and at least one of said coupling members being movable independently of said conduits into and out of engagement with the other of said coupling members for connecting and disconnecting the conduits without altering the over-all length of the coupling.

4. A coupling for joining fluid pressure lines, comprising a pair of axially aligned conduits in communication with the pressure line and stationary with respect to each other during connecting or disconnecting of the coupling, a pair of abutting head members one fixed at the inner end of each conduit and providing a valve seat, means providing a pair of valve surfaces adapted to cooperate with the valve seats on said head members for sealing the fluid pressure lines when the coupling is disconnected and said valve surfaces being movable in unison with one another, and a pair of detachable coupling members one fixed with respect to one of said conduits and the other longitudinally movable with respect to the other of said conduits whereby the over-all length of the coupling between the ends of the conduits remains constant during connecting and disconnecting thereof.

5. A coupling for joining fluid pressure lines, comprising a pair of conduits each adapted to communicate with a pressure line and said conduits being stationary with respect to each other during connecting or disconnecting of the coupling, means providing a pair of valve seats associated with the inner ends of said conduits, a pair of detachable coupling members surrounding said conduits and providing annular recesses around each of said conduits, said coupling members being movable relative to one another and one of said coupling members being movable independently of said conduits for connecting and disconnecting the conduits without altering the over-all length of the coupling, a valve member surrounding one of said conduits and adapted to cooperate with the seat at the inner end thereof, means providing a valve surface on one of said coupling members for cooperation with the valve seat on the other of said conduits, packing members disposed in each of said recesses and associated with the corresponding coupling member for preventing leakage of fluid, and means providing a passage through each of said conduits for affording restricted fluid communication between the conduits and the recesses whereby to permit the passage of fluid into said recesses in order to exert a sealing pressure on the packing members and to seat the valve member and valve surface.

JOHN N. WOLFRAM.

DISCLAIMER 2,304,390.—*John N. Wolfram*, Cleveland, Ohio. COUPLING. Patent dated Dec. 8, 1942. Disclaimer filed Jan. 28, 1947, by the assignee, *The Parker Appliance Company*.

Hereby enters this disclaimer to claims 1 and 2 of said specification.

[*Official Gazette March 11, 1947.*]